A. J. DE LA BARRE.
DEVICE FOR SECURING DEMOUNTABLE WHEELS.
APPLICATION FILED MAR. 12, 1920.
1,375,037.
Patented Apr. 19, 1921.
2 SHEETS—SHEET 1.
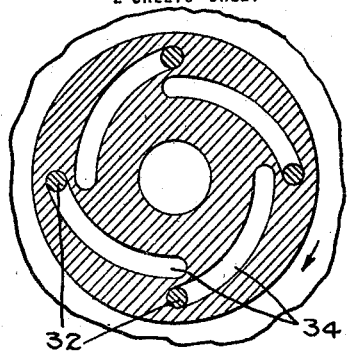
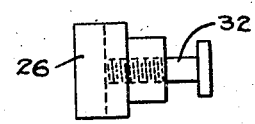
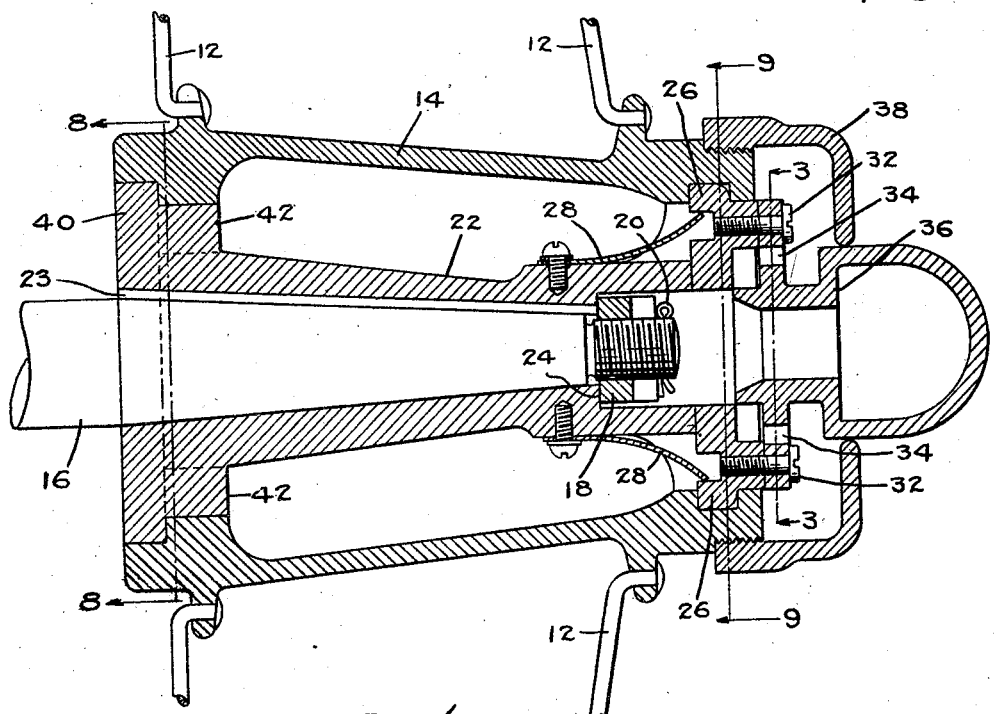
INVENTOR:
ALFRED J. DE LA BARRE.
By Whiteley and Ruckman
ATTORNEYS.

A. J. DE LA BARRE.
DEVICE FOR SECURING DEMOUNTABLE WHEELS.
APPLICATION FILED MAR. 12, 1920.
1,375,037.
Patented Apr. 19, 1921.
2 SHEETS—SHEET 2.
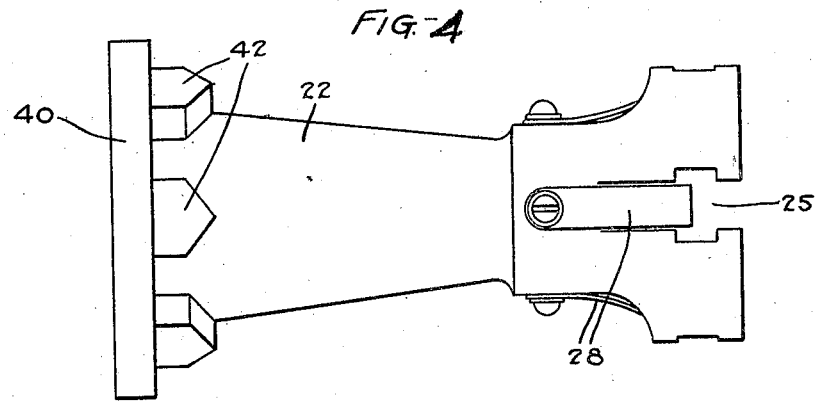
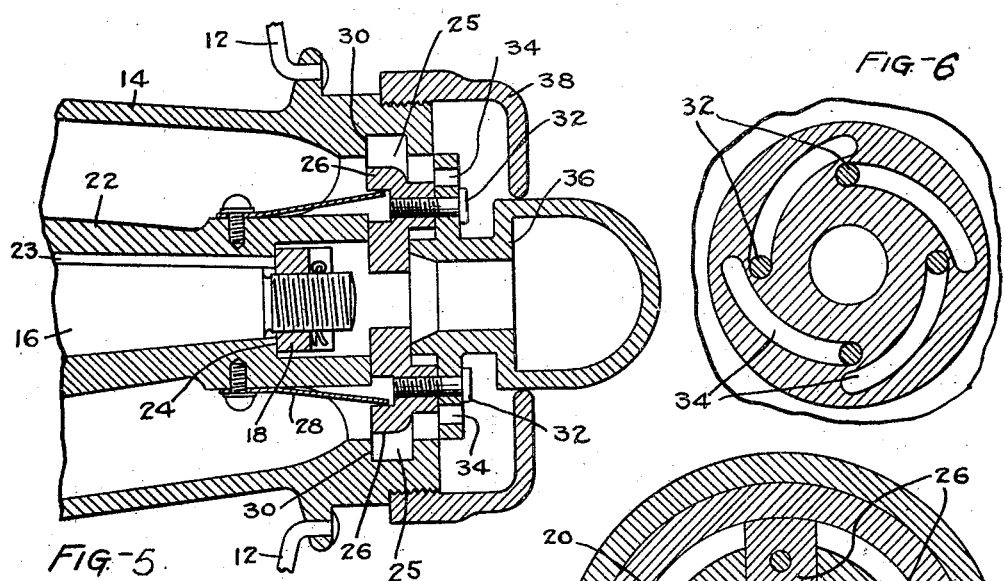
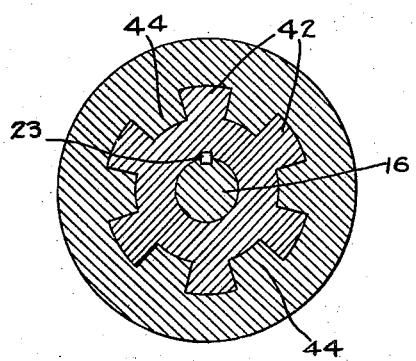
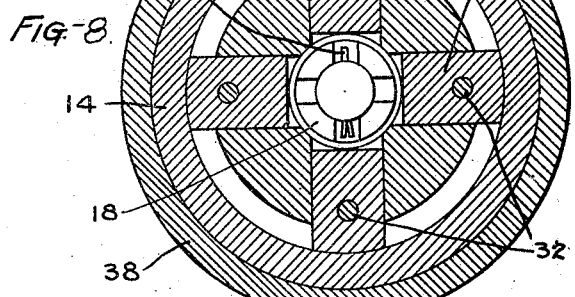
INVENTOR
ALFRED J. DE LA BARRE.
BY Whiteley and Ruckman
ATTORNEYS.

UNITED STATES PATENT OFFICE.

ALFRED J. DE LA BARRE, OF MINNEAPOLIS, MINNESOTA.

DEVICE FOR SECURING DEMOUNTABLE WHEELS.

1,375,037. Specification of Letters Patent. Patented Apr. 19, 1921.

Application filed March 12, 1920. Serial No. 365,175.

*To all whom it may concern:*

Be it known that I, ALFRED J. DE LA BARRE, a citizen of the United States, residing at Minneapolis, in the county of Hennepin and State of Minnesota, have invented certain new and useful Improvements in Devices for Securing Demountable Wheels, of which the following is a specification.

My invention relates to devices for securing demountable wheels. An object is to provide a device by means of which wheels may be easily and quickly demounted and replaced.

The full objects and advantages of my invention will appear in connection with the detailed description thereof and the novel features embodied in my inventive idea will be particularly pointed out in the claim.

In the accompanying drawings,—

Figure 1 is a sectional view of my device showing the parts in locked position. Fig. 2 is a view in cross-section on the line 3—3 of Fig. 1. Fig. 3 is a detail view. Fig. 4 is a side elevational view of the inner hub part, the detents being removed. Fig. 5 is a view similar to Fig. 1 but showing the parts in unlocked position. Fig. 6 is a view in cross-section similar to Fig. 2 showing the parts differently. Fig. 7 is a view in cross-section on the line 8—8 of Fig. 1. Fig. 8 is a view in cross-section on the line 9—9 of Fig. 1.

Referring to the construction shown in the drawings, my invention is used in connection with a wheel which is provided with spokes 12 and a hub 14. A hub-retaining device is secured upon the axle 16 by means of a nut 18 which may be prevented from unscrewing by a cotter-pin 20. The hub-retaining device consists of a sleeve-like member 22 having a shoulder 24 toward its outer end for engagement by the nut 18. When the axle is a live axle the sleeve is secured for rotation therewith by means of a key 23. The outer end of the sleeve is provided with slideways 25, best shown in Figs. 4 and 5, adapted to receive radially slidable detents 26 which are engaged by leaf springs 28 secured at one of their ends to the sleeve and which tend to force the detents outwardly. The detents 26 when in outward position engage shoulders on the hub 14 and hold the wheel upon the axle. Stud bolts 32 carried by the detents 26 extend through cam grooves 34 formed in a flange on a hollow plug member 36 which extends out through an annular cap 38 on the hub 14 when the wheel is in place on the axle. The detents 26 are retracted as shown in Fig. 5 to release the hub when the plug 36 is turned to bring the cam grooves 34 into the position shown in Fig. 6. When the cam grooves are in the position shown in Fig. 2 the detents are held securely in outward position by the springs 28 so as to engage the shoulder 30 of the hub and hold the wheel in place. The inner end of the sleeve 22 is provided with a circumferential flange 40 adjacent which are beveled lugs 42 between which fit lugs 44 on the inner portion of the hub whereby the sleeve 22 and the hub are locked together for rotation in unison.

The operation and advantages of my invention will be readily understood from the foregoing description. When the parts are turned to the position shown in Fig. 5 the wheel may be readily demounted and replaced by a spare wheel, thus avoiding the necessity of repairing or changing tires while on the road. The hub-retaining device may be quickly and easily turned from locking position to unlocking position and vice versa, and still is so constructed as to avoid liability of becoming accidentally unlocked.

I claim:

A device for securing demountable wheels comprising a sleeve member having radial slideways in its outer end, detents slidably mounted in said slideways, resilient means tending to hold said detents outwardly, an outer hub member having an annular shoulder with which said detents engage when in outward position to hold said hub member on said sleeve member, projections on said detents, and a rotatable member having cam grooves through which said projections extend whereby said detents may be moved radially inward against the tension of said resilient means to unlock the hub, said detents being so constructed that the hub member may be slid upon said sleeve member and automatically locked by the detents when the latter are in outward position.

In testimony whereof I hereunto affix my signature.

ALFRED J. DE LA BARRE.